W. A. BROWN.
RECORDING CAMERA.
APPLICATION FILED FEB. 20, 1920.
1,413,253.
Patented Apr. 18, 1922.
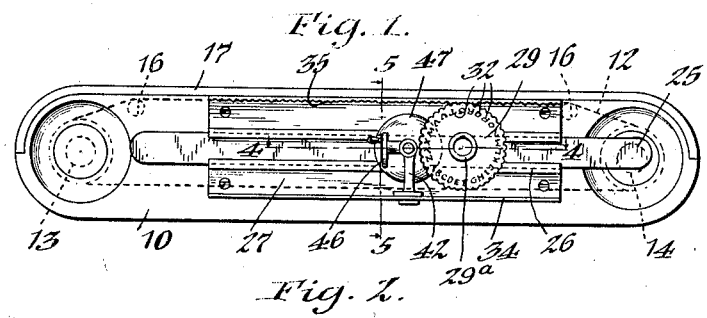
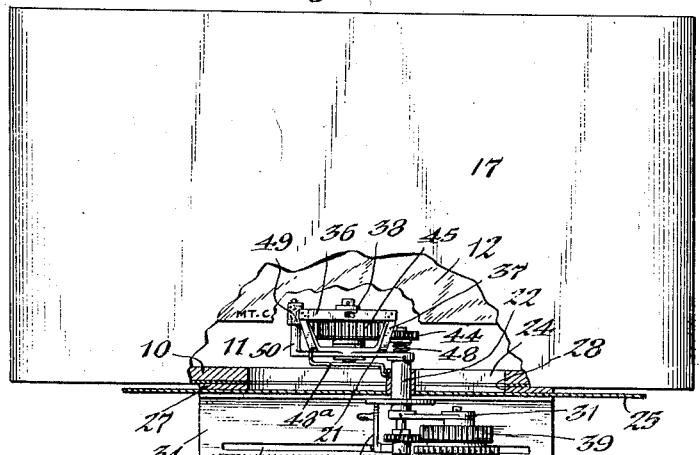
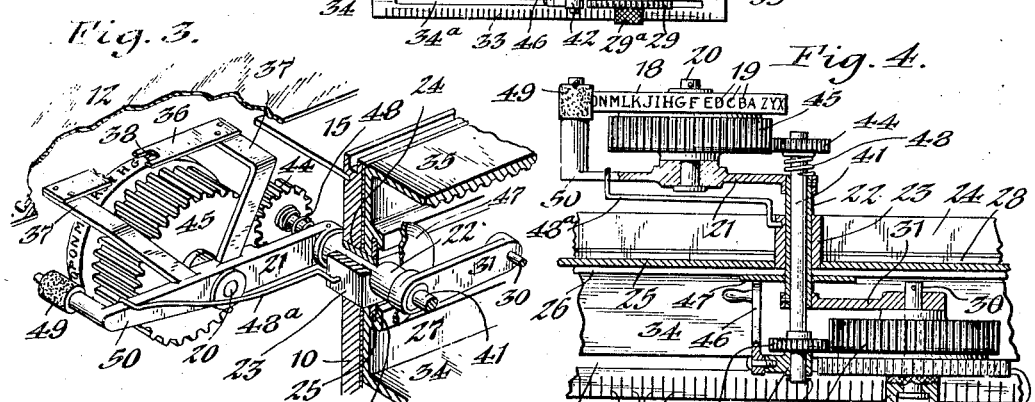
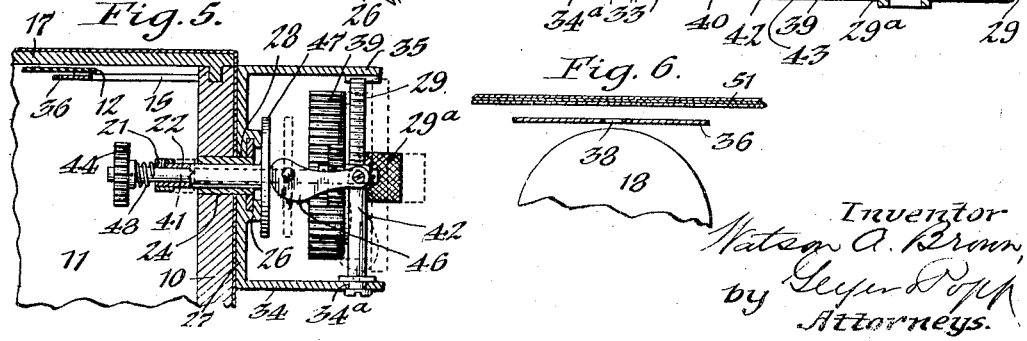
Inventor
Watson A. Brown,
by Geyer & Popp
Attorneys.

UNITED STATES PATENT OFFICE.

WATSON A. BROWN, OF ROCHESTER, NEW YORK.

RECORDING CAMERA.

1,413,253.  Specification of Letters Patent.  Patented Apr. 18, 1922.

Application filed February 20, 1920. Serial No. 360,053.

*To all whom it may concern:*

Be it known that I, WATSON A. BROWN, a citizen of the United States, residing at Rochester, in the county of Monroe and State of New York, have invented new and useful Improvements in Recording Cameras, of which the following is a specification.

This invention relates to photographic cameras having means for producing upon the film or plate, while in the camera, any desired record or data, so as to identify the negative after the development of the film and reproduce such record upon prints from said negative.

It is one of the objects of this invention to provide means of this character which are simple in construction, easy to operate and which can be produced at moderate cost.

Other objects of the invention are to provide a marking or recording mechanism which can be readily applied to existing cameras without material change of any of its parts, which produces a legible record, and which is not liable to get out of order.

In the accompanying drawings:

Figure 1 is a side elevation of a camera embodying my improvements. Figure 2 is a plan view thereof, partly in section, showing the parts in their operative position. Figure 3 is an enlarged fragmentary perspective view, partly in section, of the autographic mechanism. Figure 4 is an enlarged horizontal section on line 4—4, Fig. 1. Figure 5 is a vertical section on line 5—5, Fig. 1. Figure 6 is a fragmentary longitudinal section, on an enlarged scale, of a modification of the improvement.

Similar characters of reference indicate corresponding parts throughout the several views.

In the drawings, Figs. 1–5, the recording mechanism is shown in connection with an ordinary folding camera having the usual case 10, the light-proof chamber 11 of which contains the sensitized material such as the film 12 wound upon the usual rolls 13, 14 arranged at opposite ends of said case. The film passes over the usual open guide frame 15 and guide rollers 16 journaled at opposite ends thereof. 17 indicates the usual removable cover for the rear side of the camera case which cooperates with its side and end walls to form a light-tight joint.

Arranged within the light-proof chamber 11 of the camera case and adjacent the sensitized film 12, is an impression member, which may be of any desired form or construction, but as shown in the drawings preferably consists of a type wheel 18, the peripheral face of which is provided with suitable printing characters 19. This type wheel is rotatably mounted on an arbor 20 secured in the free end of an arm or lever 21 which is mounted for movement toward and from the face of the film or other member, or material adapted to receive the impression. Said lever 21 is secured to the inner end of an oscillatory member, preferably consisting of a transversely arranged sleeve or bearing 22 which extends through the adjacent side wall of the camera case and is journaled in a bearing block 23 guided in a longitudinal slot 24 in the side wall of said case. This slot permits the sleeve and parts connected therewith to move lengthwise of the film. To prevent light from entering the chamber 11, the slot 24 is closed in all positions of the sleeve 22 and associated parts, by a slide or shutter 25 which is carried by the bearing block 23 and movable lengthwise therewith. This shutter moves in a fixed guide 26 arranged in a channel plate 27, secured to the outside of the adjacent side wall of the camera case, and provided with a longitudinal slot 28 registering with the companion slot 24 of the case and through which the outer end of the bearing block projects to receive the shutter 25. The latter may be constructed of any suitable material which will lie flat against the channel plate 27 and prevent the entrance of light into the chamber 11 of the camera.

Arranged outside of the camera case and co-operating with the impression member 18 is an indicating and actuating device which controls the various movements of the impression member heretofore mentioned, viz: the rotation thereof to bring the desired type opposite the film, the oscillatory movement of the same which causes an impression to be made on the sensitized film, and its movement lengthwise of the latter. The preferred means for actuating this impression member comprise an indicator wheel or dial 29 rotatably mounted on an arbor 30 secured to the free end of an arm or lever 31 which is mounted for oscillatory movement in a plane at right angles to the line of travel of the film and is adapted to transmit this movement to the impression member. The lever 31 is fixed to the outer end of the sleeve 22 and extends in a direction opposite to that of the lever 21, so that in effect these levers act as a bell crank lever, a downward movement of the lever 31 causing an upward movement of the lever 21 and vice versa. The indicator wheel is provided with characters 32 corresponding to the printing characters 19 on the type wheel 18. These characters may be located on any surface of the wheel where said characters are visible to the operator, for instance, on the outer side of the wheel, as shown in Fig. 1. A scale or plurality of gage marks 33 or other appropriate means are arranged on the lower flange 34 of the channel plate 27, or other adjacent part, to enable the operator to properly set a particular character of the indicator wheel which he desires to reproduce or print on the sensitized film. The characters of the indicator wheel 29 and the corresponding printing characters of the type wheel 18 are so arranged that when a given character on said indicator wheel is set in alinement with a gage mark 33, the corresponding character on said type wheel is set in the proper position to make its impression upon the film 12 when the type wheel is moved or rocked against the latter by depressing said indicator wheel.

The indicator wheel may be provided with a suitable operating handle 29$^a$ and its peripheral face may be knurled or ribbed and normally engaging with the knurled or ribbed inner face of the upper flange 35 of the channel plate 27, thereby not only enabling the setting and proper adjustment of a given character but also gaging the spacing of the several printing characters on the film as the recording mechanism is advanced step-by-step lengthwise thereof.

36 indicates a guard arranged over the type wheel 18 and constructed of flexible material such as cloth or sheet metal. This guard is secured at its ends to arms 37 projecting upwardly from the lever 21. The guard is provided centrally thereof with an opening 38 of such a size as to allow but one printing character of the type wheel to be presented to the film at a time.

The means for rotating the type wheel 18 in unison with the indicator wheel 29 to effect the proper positioning of a printing character corresponding to a character on said indicator wheel, are preferably constructed as follows:

Mounted on the arbor 30 is a gear wheel 39 which is connected with the indicator wheel or integral therewith, as shown, and meshes with a pinion 40 fixed on the outer end of a transverse shaft 41 journaled centrally thereof in the sleeve 22 and preferably supported at its outer end in a bearing bracket 42 adapted to travel in a longitudinal slot 34$^a$ in the flange 34 of the plate 27. This shaft is held against movement transversely of the camera case by a cotter pin 43 or other means secured in the end of the shaft and the hub of the pinion 40, the cotter and said pin bearing against opposite sides of the bracket 42. To the inner end of this shaft is fixed a pinion 44 meshing with a gear wheel 45 mounted on the arbor 20 and connected with the type wheel 18. The gear wheels 39 and 45 have comparatively wide faces while the pinions 40 and 44 have comparatively narrow faces to permit the sleeve 22 and associated parts to be shifted relatively to said shaft, as will be presently described.

The preferred devices for shifting the recording mechanism into and out of the path of the sensitized film comprise a cam or cam-lever 46 pivotally mounted on the bearing bracket 42 or other adjacent part. This cam lever is adapted to engage the face of a flange or collar 47 fixed on the sleeve 22 and shift the latter together with the recording mechanism inwardly into the path of the film or opposite its marginal portion. A coil spring 48 surrounding the shaft 41 and bearing at one end against the inner end of the sleeve 22 and at the other end against the pinion 44 serves to shift the recording mechanism outwardly clear of the film,—when the cam lever 46 is released from the collar 47 of the shifting sleeve. When the parts are in their operative position, as shown by full lines in the drawings, the cam lever is on the dead center and thus reliably and firmly holds them in that position. It is obvious that, as the sleeve 22 is shifted in one direction or the other, the gear wheels 39 and 43 remain constantly in mesh with their respective pinions 40 and 44, owing to the greater width of said gears as compared with that of the pinions.

Normally, the indicator wheel is preferably held in engagement with the knurled flange 35 of the plate 27 by a suitable spring 48$^a$, that shown in the drawings being fixed at one end to the bearing block and at its other end to the upper side of the arm 21.

An inking roller 49 is suitably mounted on the extension 50 of the lever 21, said roller being constantly in contact with the periphery of the type wheel 19 to keep the same inked.

In the use of the recording device, the user first shifts the recording mechanism from its inoperative position, shown by dotted lines, Fig. 5, to its operative position shown by full lines in the same figure and remaining figures, by turning the cam lever upwardly to a substantially horizontal position which movement shifts said mechanism opposite the margin of the film as hereinbefore described. He then grasps the handle of the indicator wheel and rotates it in a clockwise direction until the desired character registers with the adjacent gage mark 33 on the channel plate 27, and then exerts a downward pressure on the handle to move the impression member against the film and impress or reproduce the corresponding printing character thereon. The downward pressure on the handle is now released and the mechanism advanced one step or one notch and another character is reproduced on the film in the same manner, and so on, until the desired record is completed, whereupon the recording mechanism may be allowed to move to its inoperative position by disengaging the cam lever from the collar 47 of the shifting sleeve 22.

The ends of the slot 24 in the camera case serve to limit the extent of movement of the recording mechanism, and the length of said slot determines the amount of recording data that may be printed on the film.

All the movable parts of the device are carried by the sleeve 22, producing a very simple and compact construction and one capable of being readily applied to existing cameras.

While the invention is herein shown and described in connection with a photographic camera, it is also applicable to a lightproof box or casing containing sensitized material, for printing thereon.

The recording impression is not necessarily made directly upon the film. If desired, it may for example be made upon a transparent strip overlying the face of the film in which case the matter imprinted on said strip is photographed or reproduced upon the film. Such a modified embodiment of the invention is shown in Fig. 6, where 51 indicates the transparent strip covering the film. In practice, this strip may be coextensive in length and width with the film and it may be guided upon the usual film spools or other separate spools or supports.

The term "strip" employed in the appended claims is intended to cover either the ordinary sensitized film or strip which receives a direct impression from the type wheel 18 shown in Figs. 1–5, or the transparent strip 51 shown in Fig. 6, which reproduces the impression received by it upon the sensitized film or strip.

I claim as my invention:

1. The combination with a camera case for enclosing a strip to be marked, of a recorder comprising a printing member arranged within the case for producing an impression on said strip, and means arranged outside of the case for moving said printing member against said strip.

2. The combination with a camera case for enclosing a strip to be marked, of a recorder comprising a printing member arranged within the case and having a plurality of printing characters thereon, means arranged outside of the case for shifting said printing member to present different printing characters to said strip, and means for moving said printing member against the strip.

3. The combination with a camera case for enclosing a strip to be marked, of a recorder comprising a rotatable printing member arranged within the case and having a plurality of printing characters on its face, and means arranged outside the case for moving said printing member against said strip.

4. The combination with a camera case for enclosing a strip to be marked, of a recorder comprising a printing member arranged within the case and having a plurality of printing characters thereon, indicator means arranged outside of said case and having characters corresponding to the characters on said printing member, and actuating means for the latter cooperating with said indicator means.

5. The combination with a camera case for enclosing a strip to be marked, of a recorder comprising an impression member arranged within the case and having a plurality of printing characters thereon, said member being shiftable into and out of operative position relatively to said strip, and means outside of the case for moving said member against said strip.

6. The combination with a camera case for enclosing a strip to be marked, of a recorder comprising a printing member arranged within the case and having a plurality of printing characters thereon, said member being shiftable transversely of said strip into and out of operative position relatively thereto, means arranged within the case for moving said impression member to its inoperative position, and means outside of the case for moving said printing member to its operative position.

7. The combination with a camera case for enclosing a strip to be marked, of a recorder comprising a printing member arranged within the case and having a plurality of printing characters thereon, and means for shifting said member transversely of said strip comprising spring mechanism for moving said printing member clear of the exposed portion of the strip, and manually controlled means arranged outside of the case for moving said impression member opposite the exposed portion of the strip.

8. The combination with a camera case for enclosing a strip to be marked, of a recorder comprising an impression member arranged within the case and having a plurality of printing characters thereon, means for shifting said member transversely of said strip comprising spring mechanism for moving said impression member to an inoperative position and manually controlled means arranged outside of the case for moving said impression member to operative position, and means for retaining said impression member in its operative position.

9. The combination with a camera case for enclosing a strip to be marked, of a recorder comprising means arranged within the case for producing an impression on said strip, and means arranged outside of the case for moving said impression means against said strip, both of said means being movable as a unit lengthwise of the strip.

10. The combination of a camera case for enclosing a strip to be marked, said case having a slot extending lengthwise of said strip, a recorder comprising means arranged within the case for producing an impression on said strip, shifting means extending through said slot for moving said impression means lengthwise of said strip, and a light-excluding shutter applied to said slot and movable with said shifting means.

11. The combination with a camera case for enclosing a strip to be marked, said case having a slot extending lengthwise of said strip, of a recorder comprising means arranged within the case for producing an impression on said strip, shifting means extending through said slot for moving said impression means lengthwise of the strip, and a light-excluding shutter applied to said slot and movable lengthwise thereof, the shutter carrying both said impression means and said actuating means.

12. The combination with a camera case for enclosing a strip to be marked, of a recorder comprising a movable member arranged partly inside of the case and partly outside thereof, a printing member mounted on the internal portion of said movable member, and means on the external portion of the latter for actuating said printing member.

13. The combination with a camera case for enclosing a strip to be marked, of a recorder comprising an oscillatory member arranged partly inside of the case and partly outside thereof, an impression member mounted on the internal portion of said oscillatory member and having a plurality of printing characters thereon, and means mounted on the external portion of said oscillatory member for moving said impression member to different positions to present different printing characters to said strip.

14. The combination of a camera case for enclosing a strip to be marked, said case having a slot in its wall, a recorder comprising an oscillatory member movable lengthwise in said slot, impression means arranged on the internal portion of said oscillatory member, and means arranged on the external portion of the latter for actuating said impression means to print on said strip.

15. The combination of a camera case for enclosing a strip to be marked, said case having a slot in its wall, a recorder comprising an oscillatory member movable lengthwise in said slot, impression means arranged on the inner portion of said oscillatory member, means arranged on the outer portion of the latter for actuating said impression means to print on said strip, and a light-excluding shutter applied to said slot and movable lengthwise with said oscillatory member.

16. The combination of a camera case for enclosing a strip to be marked, said case having a slot in its wall, a recorder comprising an oscillatory member movable lengthwise in said slot, arms mounted at the inner and outer ends of said oscillatory member and extending in opposite directions therefrom, impression means carried by said internal arm, means carried by said external arm for actuating said impression means, and a light-excluding shutter applied to said slot and movable lengthwise with said oscillatory member.

17. The combination of a camera case for enclosing a strip to be marked, said case having a slot in its wall, a recorder comprising an oscillatory member movable lengthwise in said slot, arms mounted at the inner and outer ends of said oscillatory member and extending in opposite directions therefrom, an impression member arranged on said internal arm and having a plurality of printing characters thereon, means arranged on said external arm for moving said impression member to different positions to present different printing characters to said strip, means for moving said impression member against said strip, and a light-excluding shutter applied to said slot and movable lengthwise with said oscillatory member.

18. The combination with a camera case for enclosing a strip to be marked, of a recorder comprising an oscillatory member arranged partly inside and partly outside of the case, a rotatable impression member arranged on the internal portion of said oscillatory member and having a plurality of printing characters thereon, a rotatable indicator wheel arranged on the external portion of said oscillatory member and having characters thereon corresponding to the printing characters on said impression member, and means for transmitting motion from said indicator wheel to said impression member.

19. The combination of a camera case for enclosing a strip to be marked, said case having a slot in its wall, a recorder comprising an oscillatory sleeve movable in said slot, arms mounted at the inner and outer ends of said sleeve and extending in opposite directions therefrom, a rotatable impression member arranged on said internal arm and having a plurality of printing characters thereon, a rotatable indicator wheel arranged on said external arm and having characters thereon corresponding to the printing characters on said impression member, a light-excluding shutter applied to said slot and movable lengthwise with said sleeve, a shaft journaled in said sleeve, and gearing for transmitting motion from said indicator wheel to said shaft and from the latter to said impression member.

20. The combination with a camera case for enclosing a strip to be marked, a shaft extending through a wall of the case and arranged transversely of said strip, an oscillatory member mounted to slide on said shaft, an impression member mounted on the internal portion of said oscillatory member, means on the external portion of the latter for actuating said impression member, a spring tending to shift said oscillating member to its outer position, and a cam for shifting the oscillatory member to its inner position.

21. The combination of a camera case for enclosing a strip to be marked, a recorder comprising a rotatable impression member for said strip arranged within the case and having a plurality of printing characters on its face, an actuating and indicating device for the impression member arranged outside of said case and having characters corresponding to those on said impression member, a gaging device arranged on said case with which said actuating and indicating device co-operates to predetermine the proper setting of a printing character to be impressed upon said strip, and means for moving said impression member against said strip.

22. The combination of a camera case for enclosing a strip to be marked, said case having a slot in its wall, a recorder comprising a rotatable impression member arranged within the case and having a plurality of printing characters on its face, an actuating and indicating device for said impression member arranged outside of the case and having characters corresponding to those on said impression member and also having a knurled face, said impression member and said indicating device being movable as a unit lengthwise in said slot, a plate secured to said case and having upper and lower flanges, the upper flange being knurled and normally engaged by the corresponding face of said actuating and indicating device, and the lower flange being provided with a longitudinal series of gage marks for setting a desired character of the actuating and indicating device in proper position to predetermine the setting of the corresponding character on the impression member, and means for moving said impression member against said strip.

23. The combination with a camera case for enclosing a strip to be marked, of a recorder comprising a rotatable impression member arranged within the case and having a plurality of printing characters on its face, inking means co-operating with said impression member, and means arranged outside of the case for moving said impression member against said strip.

24. The combination with a camera case for enclosing a strip to be marked, of a recorder comprising an impression member arranged within the case and having a plurality of printing characters thereon, a guard arranged across the face of said impression member and provided with an opening therein to present a printing character to said strip, and means arranged outside of the case for moving said impression member against said strip.

25. The combination with a camera case for enclosing a strip to be marked, of a recorder comprising an oscillatory member arranged partly within and partly without said case, an impression member carried by the internal portion of said oscillatory member, means for moving said impression member against said strip arranged on the external portion of said oscillatory member, and a spring for returning said impression member to its inoperative position.

WATSON A. BROWN.